United States Patent
Engelien-Lopes et al.

(10) Patent No.: US 9,942,070 B2
(45) Date of Patent: Apr. 10, 2018

(54) RADIO COMMUNICATION

(71) Applicant: Nordic Semiconductor ASA, Trondheim (NO)

(72) Inventors: David Alexandre Engelien-Lopes, Trondheim (NO); Sverre Wichlund, Trondheim (NO); Eivind Olsen, Trondheim (NO); Phil Corbishley, Trondheim (NO); Ola Bruset, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 15/312,148

(22) PCT Filed: Jun. 9, 2015

(86) PCT No.: PCT/GB2015/051669
§ 371 (c)(1),
(2) Date: Nov. 17, 2016

(87) PCT Pub. No.: WO2015/189584
PCT Pub. Date: Dec. 17, 2015

(65) Prior Publication Data
US 2017/0078125 A1   Mar. 16, 2017

(30) Foreign Application Priority Data

Jun. 13, 2014 (GB) .................................. 1410641.3
Jun. 16, 2014 (GB) .................................. 1410713.0

(51) Int. Cl.
*H04L 27/20* (2006.01)
*H04B 1/7073* (2011.01)
(Continued)

(52) U.S. Cl.
CPC ....... *H04L 27/2017* (2013.01); *H04B 1/7073* (2013.01); *H04J 13/0074* (2013.01);
(Continued)

(58) Field of Classification Search
CPC ....... H04L 27/2017; H04L 27/22; H04L 7/00; H04L 27/18; H04L 27/2003;
(Continued)

(56) References Cited

U.S. PATENT DOCUMENTS

| 4,943,974 A | 7/1990 | Motamedi |
| 8,374,291 B1 | 2/2013 | Himsoon et al. |

(Continued)

FOREIGN PATENT DOCUMENTS

| EP | 1217781 A1 | 6/2002 |
| WO | WO 01/99317 A1 | 12/2001 |
| WO | WO 02/093756 A2 | 11/2002 |

OTHER PUBLICATIONS

GB1410713.0, Search Report Under Section 17(5), U.K. Intellectual Property Office, dated Oct. 31, 2014, 3 pages.

(Continued)

*Primary Examiner* — Vineeta Panwalkar
(74) *Attorney, Agent, or Firm* — Klarquist Sparkman, LLP

(57) ABSTRACT

A radio transmitter (4) comprises an encoder (5) that receives one or more variable message bits, and encodes each message bit that has a first value as a predetermined first binary chip sequence and encodes each message bit that has the opposite value as a predetermined second binary chip sequence. The radio transmitter (4) transmits data packets, each comprising (i) a predetermined synchronization portion, comprising one or more instances of the first binary chip sequence, and (ii) a variable data portion, comprising one or more encoded message bits output by the (Continued)

encoder. A radio receiver (9) receives such data packets. It uses the synchronization portion of a received data packet to perform a frequency and/or timing synchronization operation, and then decodes message bits from the data portion of the data packet.

32 Claims, 4 Drawing Sheets

(51) Int. Cl.
<table>
<tr><td>H04J 13/00</td><td>(2011.01)</td></tr>
<tr><td>H04J 13/10</td><td>(2011.01)</td></tr>
<tr><td>H04L 27/233</td><td>(2006.01)</td></tr>
<tr><td>H04L 27/26</td><td>(2006.01)</td></tr>
<tr><td>H04L 7/00</td><td>(2006.01)</td></tr>
<tr><td>H04L 27/18</td><td>(2006.01)</td></tr>
<tr><td>H04L 27/22</td><td>(2006.01)</td></tr>
<tr><td>H04L 23/02</td><td>(2006.01)</td></tr>
<tr><td>H04L 27/00</td><td>(2006.01)</td></tr>
</table>

(52) U.S. Cl.
CPC ............. *H04J 13/10* (2013.01); *H04L 7/00* (2013.01); *H04L 27/18* (2013.01); *H04L 27/2003* (2013.01); *H04L 27/22* (2013.01); *H04L 27/233* (2013.01); *H04L 27/2659* (2013.01); *H04L 27/2662* (2013.01); *H04L 23/02* (2013.01); *H04L 2027/0046* (2013.01); *H04L 2027/0065* (2013.01)

(58) Field of Classification Search
CPC .............. H04L 27/2662; H04L 27/2659; H04L 27/233; H04L 2027/0065; H04L 23/02; H04L 2027/0046; H04J 13/0074; H04J 13/10; H04B 1/7073
See application file for complete search history.

(56) References Cited

U.S. PATENT DOCUMENTS

<table>
<tr><td>2004/0165576 A1*</td><td>8/2004</td><td>Reunamaki ............. H04L 7/041<br>370/350</td></tr>
<tr><td>2004/0170120 A1</td><td>9/2004</td><td>Reunamaki et al.</td></tr>
<tr><td>2008/0137722 A1*</td><td>6/2008</td><td>Cherubini ........ G11B 20/10009<br>375/232</td></tr>
<tr><td>2014/0086125 A1</td><td>3/2014</td><td>Polo et al.</td></tr>
</table>

OTHER PUBLICATIONS

GB1509982.3, Combined Search and Examination Report Under Sections 17 and 18(3), U.K. Intellectual Property Office, dated Nov. 27, 2015, 5 pages.

Sust, "Performance of digital matched filters in a direct sequence spread spectrum receiver," *Military Communications Conference, 1988. MILCOM 88, Conference record. 21st Century Military Communications—What's Possible? 1988 IEEE*, Oct. 23-26, 1988, pp. 961-967.

International Search Report and Written Opinion for PCT/GB2015/051669, dated Sep. 11, 2015, 17 pages.

\* cited by examiner

RADIO COMMUNICATION

CROSS REFERENCE TO RELATED APPLICATIONS

This is the U.S. National Stage of International Application No. PCT/GB2015/051669, filed Jun. 9, 2016, which was published in English under PCT Article 21(2), which in turn claims the benefit of Great Britain Application No. GB1410713.0, filed Jun. 16, 2014 and Great Britain Application No. GB1410641.3, filed Jun. 13, 2014.

This invention relates to radio transmitters and receivers for communicating binary data.

Various radio communication systems are known for transmitting binary message data. Examples include Bluetooth™ and Bluetooth Low Energy™. It is important for a radio receiver to determine timing synchronisation quickly and accurately from a received data packet, in order to be able to decode the message data reliably. It is known to include a predetermined synchronisation sequence, known in advance to both the transmitter and the receiver, near the beginning of each data packet. The receiver can use this to perform operations such as frequency synchronisation, phase synchronisation, symbol timing estimation, and Automatic Gain Control (AGC) training, before decoding the payload message data.

When a received radio signal is weak (e.g. due to there being considerable distance between the transmitter and the receiver), it can be harder for the receiver to obtain an accurate synchronisation. Trying to mitigate this can lead to significant additional complexity in the radio receiver. The present invention seeks to provide a novel approach that facilitates a particularly efficient radio receiver design with good performance at low signal levels.

From a first aspect, the invention provides a radio transmitter comprising an encoder configured to receive one or more variable message bits and to encode each message bit that has a first value as a predetermined first binary chip sequence and to encode each message bit that has the opposite value as a predetermined second binary chip sequence, wherein the radio transmitter is configured to transmit data packets, each comprising (i) a predetermined synchronisation portion, comprising one or more instances of the first binary chip sequence, and (ii) a variable data portion, comprising one or more encoded message bits output by the encoder.

From a second aspect, the invention provides a radio receiver configured to:
  receive data packets, each comprising a predetermined synchronisation portion, comprising one or more instances of a predetermined first binary chip sequence, and a variable data portion, comprising one or more encoded message bits, wherein each message bit that has a first value is encoded as the first binary chip sequence and each message bit that has the opposite value is encoded as a predetermined second binary chip sequence;
  use the synchronisation portion of a received data packet to perform a frequency and/or timing synchronisation operation, before decoding the data portion of the data packet; and
  decode message bits from the data portion of the data packet.

From a third aspect, the invention provides a radio communication system comprising a radio transmitter and a radio receiver, wherein the radio transmitter:
  comprises an encoder configured to receive one or more variable message bits and to encode each message bit that has a first value as a predetermined first binary chip sequence and to encode each message bit that has the opposite value as a predetermined second binary chip sequence; and
  is configured to transmit data packets, each comprising (i) a predetermined synchronisation portion, comprising one or more instances of the first binary chip sequence, and (ii) a variable data portion, comprising one or more encoded message bits output by the encoder,
and wherein the radio receiver is configured to:
  receive the data packets transmitted by the radio transmitter;
  use the synchronisation portion of a received data packet to perform a frequency and/or timing synchronisation operation, before decoding the data portion of the data packet; and
  decode the message bits from the data portion of the data packet.

From a fourth aspect, the invention provides a method of radio communication, comprising:
  transmitting a data packet by radio, the data packet comprising (i) a predetermined synchronisation portion, comprising one or more instances of a first binary chip sequence, and (ii) a data portion, comprising one or more encoded message bits, wherein each message bit that has a first value is encoded as a predetermined first binary chip sequence, and each message bit that has the opposite value is encoded as a predetermined second binary chip sequence,
  receiving the data packet;
  using the synchronisation portion of the received data packet to perform a frequency and/or timing synchronisation operation; and
  decoding the message bits from the data portion of the received data packet.

Thus it will be seen that the same binary chip sequence is used both for synchronisation and for data encoding. This allows for a particularly efficient radio receiver design, because most of the circuitry in the receiver can be shared for both purposes. In particular, the receiver may use a fixed-coefficient correlator for both operations, as explained in more detail below.

In some embodiments, the synchronisation portion and the variable data portion are modulated on a radio carrier wave using frequency-shift-keying (FSK); preferably Gaussian FSK (GFSK); more preferably 2-level GFSK. Where GFSK modulation is used, a modulation index of approximately 0.5 is preferred (preferably within around 20% of 0.5, or more preferably within around 10% of 0.5, such as between around 0.45 and around 0.55). In some embodiments, the radio receiver may be configured to demodulate the received data portion using a differential-binary-phase-shift-keying (DBPSK) demodulator. This is possible because, for suitable first and second binary chip sequences, the transmitted signal, modulated using GFSK, can have qualities of a DBPSK signal. In particular, for suitable sequences, the receiver is able to decode data based on phase differences between portions of successive sequences in the data portion, as is explained in more detail below.

The frequency of the carrier wave may change between successive data packets according to a predetermined frequency-hopping sequence. The radio transmitter and/or receiver may be configured to communicate using a physical layer, and optionally other layers, as defined in a Bluetooth™ specification, such as the Bluetooth™ Low Energy™ Physical Layer Specification section of the Bluetooth™ Core Specification 4.0, published 30 Jun. 2010, or any later version.

The first binary chip sequence may be of any length, but is preferably an even number of bits long, greater or equal to four, It may, for instance, be 4, 8, 16, 24, 32, 48, 64 or more bits long. In some preferred embodiments it is 16 bits long. The same applies for the second binary chip sequence. The first and second binary chip sequences are preferably the same length as each other.

The first binary chip sequence is preferably phase neutral, when modulated using GFSK; i.e. it is such that the phase of the carrier signal, modulated with the first binary chip sequence, is substantially the same at the start and end of the first binary chip sequence. The second binary chip sequence is preferably also phase neutral. This is advantageous as it allows the radio receiver to identify the first and second binary chip sequences in the data portion more easily, because a constant phase can be assumed to be present at the end of each chip sequence. It can also enable better automatic frequency control on the receiver.

The first binary chip sequence preferably consists of an equal number of zero bits and one bits. The second binary chip sequence preferably also consists of an equal number of zero bits and one bits. This is advantageous as it means that, when using GFSK modulation, any modulation errors automatically cancel out over a sequence, and thus do not need to be estimated or tracked in the receiver.

The second binary chip sequence is preferably equal to the first binary chip sequence except at a number of predetermined bit positions, where it differs. This number is preferably less than half the length of the first binary chip sequence. It is preferably an even number. In some preferred embodiments, the first and second binary chip sequences differ at exactly two bit positions, which are preferably the first and last bit positions. This can allow for the efficient use of a correlator in the radio receiver, as explained in more detail below.

The second binary chip sequence preferably differs from the first binary chip sequence in at least the first and last bit positions. In particularly preferred embodiments, the first and second chip sequences are identical to each other except for the first and last bit positions, at which they differ. The first chip sequence preferably has different binary values in its first and last bit positions (and hence, so does the second sequence, in embodiments in which they differ in the first and last positions). This ensures that the last chip of a sequence in the data portion will have a different value from the first chip in the immediately following sequence whenever the two message bits are the same as each other (two '1' message bits, or two '0' message bits), and will have the same value whenever the two message bits are different (message bits '1 0', or '0 1'). When using GFSK modulation with a modulation index of approximately 0.5, this gives rise to a phase shift of approximately 0 or approximately $\pi$ between the middle sections of adjacent sequences (i.e. for the whole sequence except for the first and last bit positions). This is because every '1' bit in the sequence results in a $\pi/2$ positive phase shift, while every '0' results in a $\pi/2$ negative phase shift. The presence or absence of a phase shift between adjacent sequences is determined by the value of the underlying message bits. This allows the radio receiver to decode the message bits simply by determining the phase shifts between successive chip sequences in the data portion of a received packet. No phase shift indicates a repetition of the same message bit, while a phase shift indicates a change of message bit. The radio receiver can use this differential information to decode the underlying message data. It can determine whether the very first message bit should be decoded as a '0' or a '1' based on whether there is a phase change between the first message chip sequence and the last chip sequence of the synchronisation portion. Alternatively, in some embodiments, the message data may already be differentially encoded before it is transmitted by the radio transmitter; in this case, the original data can be determined directly using a differential decoder on the radio receiver.

If the GFSK modulation index is not precisely 0.5, the same approach can still be used, but the phase shift will either be approximately 0 or a value further removed from $\pi$ (depending on how far the modulation index is away from 0.5).

The first binary chip sequence is preferably such that it has maximum autocorrelation performance, over the set of all possible sequences of a given length, subject to the constraints that the sequence must have an equal number of zero bits and one bits, and that it must have first and last bits that differ in value from each other. This allows the receiver to perform reliable synchronisation timing, by applying a correlation operation to the received synchronisation portion, and also to decode the message bits reliably. Sequences that are do not have this property may nevertheless still be useful. In some embodiments, any sequence having an autocorrelation quality of less than 0.3, or preferably less than 0.28, or more preferably less than 0.26, may be used as the first binary chip sequence, potentially subject to any one or more of the additional constraints mentioned elsewhere herein, where the autocorrelation quality for a sequence is determined as the ratio of the maximum sidelobe amplitude to the zero-lag peak amplitude, when the sequence is correlated with a pulse train of four sequence-repetitions.

The 16-chip sequence [0 0 0 1 1 0 1 0 1 1 0 0 1 0 1 1], its bitwise complement, the reversed sequence, and the reversed bitwise complement, have been found to provide particularly good performance when used as the first binary chip sequence. Particularly preferred embodiments use one of these sequences. The second binary chip sequence may then be the first chip sequence with the first and last bits flipped; i.e. [1 0 0 1 1 0 1 0 1 1 0 0 1 0 1 0], its bitwise complement, the reversed sequence, or the reversed bitwise complement (respectively).

The predetermined synchronisation portion of the data packets preferably comprises between one or two and around 30 instances of the first binary chip sequence; more preferably between around five and around 30 instances. In some embodiments, it comprises exactly or approximately 15 instances. This is considered to be a particularly good trade-off between (i) having sufficient instances to allow for reliable synchronisation, and to enable any drift correction in the receiver to settle before the data portion arrives, and (ii) keeping the data packets as short as possible to reduce power consumption in the transmitter. The sequences instances in the synchronisation portion preferably follow one immediately after another, without any gaps. The data portion preferably follows after the synchronisation portion without any gap. The receiver is preferable configured to perform drift tracking on at least the synchronisation portion. By including the synchronisation portion and the data portion in the same data packet, with substantially no gap between them, there is no loss of phase information between the two portions, allowing for particularly efficient drift tracking across the whole data packet.

The radio receiver preferably comprises a correlator. The receiver is preferably configured to use the correlator when performing the frequency and/or timing synchronisation operation. The receiver may use the correlator output for frequency ramp tracking; e.g. as part of an Automatic Frequency Control (AFC) loop. The correlator is preferably a fixed-coefficient correlator. This is desirable as it can be implemented in silicon with a relatively small number of gates. Reusing the same correlator for synchronisation and for data correlation leads to a small receiver footprint and reduced complexity. The correlator may be configured to correlate a received signal with the first binary chip sequence and/or with a sub-sequence thereof. In some embodiments, it may be configured to correlate a received signal with a combination of two or more copies of the first binary chip sequences, when processing the synchronisation portion; for example, it may be a 32-bit correlator and may be configured to correlate the received synchronisation portion with a 32-bit pattern consisting of two copies of a 16-bit first binary chip sequence, one after the other. Such a 32-bit correlator may be simulated by applying suitable processing to the output of a 16-bit correlator. Such a multiple-length correlator is preferably configured to revert to correlating the received signal against a single instance of the first binary chip sequence, or a sub-sequence thereof, when processing the data portion of the received signal.

The correlator is preferably arranged to be able to correlate a received signal with a sub-sequence of the first binary chip sequence. It may be switchable between two modes: a first mode in which is correlates against the complete first binary chip sequence, and a second mode in which it correlates against a sub-sequence of the first binary chip sequence. The sub-sequence is preferably defined by the bit positions at which the first and second binary chip sequences have the same values. The sub-sequence is preferably a contiguous sequence of bits from the first binary chip sequence. For example, where the first chip sequence is a 16-bit sequence, and the second chip sequence differs only at the first and last bit positions, the correlator may be able to correlate against just the middle 14 bits of the sequences when in the first mode. The radio receiver may use the first mode when processing the synchronisation portion of a received data packet, and may switch the correlator to the second mode when decoding message bits from the data portion.

This idea is novel in its own right and, from a further aspect, the invention provides a radio receiver comprising a fixed-coefficient correlator that is switchable between a first mode in which it is configured to correlate a received signal against a binary chip sequence, and a second mode in which it is configured to correlate a received signal against a shorter sub-sequence from the binary chip sequence, wherein the correlator is configured, when in the second mode, to output a signal representative of a phase shift between two successive occurrences of the sub-sequence in a received signal. The radio receiver may be configured to use the output from the correlator to decode message data from a received signal. Features of the earlier aspects and embodiments may be features of embodiments of this aspect also.

The correlator is preferably configured to output amplitude information. The radio receiver may use this amplitude information to perform symbol timing synchronisation. The correlator is preferably also configured to output phase information. The radio receiver is preferably configured to use this phase information to perform an initial frequency synchronisation. The radio receiver may also be configured to use this information to perform on-going frequency drift tracking, and to apply appropriate adjustment or compensation if the frequency drifts. This is particularly straightforward when, as in preferred embodiments, the binary chip sequences are phase neutral, since the phase should always return to zero after each sequence, unless there is frequency drift.

The radio receiver is preferably arranged to use the correlator to determine whether a sub-sequence in the data portion of a received data packet has an approximately 0 or an approximately $\pi$ phase change relative to the immediately-preceding sub-sequence in the data portion. The correlator preferably outputs a signal representative of this phase change, suitable for the radio receiver to use to determine the message bits.

Alternatively, in embodiments of any of the aspects herein, the receiver may comprise a fixed-coefficient correlator that correlates a received signal against a shorter sub-sequence for both the data portion and the synchronisation portion. The correlator may be configured to ignore all those bit positions at which the first binary chip sequence differs from the second binary chip sequence, and instead to correlate on those positions at which they agree. This may result in lower synchronisation performance, but it would reduce the size and complexity of the receiver. Such a correlator preferably determines whether a sub-sequence in the data portion has an approximately 0 or $\pi$ phase change relative to the preceding sub-sequence in the data portion, and outputs a signal representative of this phase change, which the radio receiver may use to determine the message bits.

The data portion of the data packet may comprise any appropriate information, such as any one or more of: address information, a data payload, error-correction information, etc. Data packets may be sent and received on a predetermined schedule, or erratically.

In some embodiments of the invention, the synchronisation portion, and a '1' bit (or equivalently a '0' bit) in the data portion, preferably uses any 16-bit pattern taken from the table below (or the bitwise complement and/or back-to-front reflection of one of the entries). The opposite bit value in the data portion may be represented as the same sequence but with the first and last bit values flipped.

The table presents possible 16-bit sequences in decreasing order to autocorrelation quality, where the quality value shown for a sequence is the ratio of the maximum sidelobe amplitude to the zero-lag peak amplitude, when the sequence is correlated with a pulse train of four sequence-repetitions (determined by simulation). The sequences towards the top of the table are preferred, but any of these sequences, or others, may still advantageously be used with embodiments of the invention.

| Pattern (for 16-bit correlator) | Quality |
| --- | --- |
| [0 0 0 1 1 0 1 0 1 1 0 0 1 0 1 1] | 0.250266 |
| [0 1 0 1 1 0 0 0 1 1 0 1 0 0 1 1] | 0.250924 |
| [0 1 1 0 0 1 0 1 1 0 0 0 1 1 0 1] | 0.251075 |
| [1 0 0 1 1 0 1 0 0 1 1 1 0 0 1 0] | 0.252291 |
| [1 0 1 0 0 1 1 1 0 0 1 0 1 1 0 0] | 0.252481 |
| [1 1 0 1 0 0 1 1 0 1 0 1 1 0 0 0] | 0.252488 |
| [1 1 0 1 0 1 1 0 0 0 1 1 0 1 0 0] | 0.252488 |
| [1 1 1 0 0 1 0 1 0 0 1 1 0 1 0 0] | 0.252488 |
| [1 1 0 0 0 1 1 0 1 0 1 1 0 0 1 0] | 0.252821 |
| [1 1 0 0 1 0 1 1 0 0 0 1 1 0 1 0] | 0.252821 |
| [0 0 1 0 1 1 0 0 1 0 1 0 0 1 1 1] | 0.253584 |
| [0 0 0 1 1 0 1 0 1 1 1 0 1 0 0 1] | 0.253801 |
| [0 0 0 1 0 1 0 0 1 1 1 0 1 1 0 1] | 0.253849 |
| [0 0 1 0 1 0 0 1 1 1 0 0 1 0 1 1] | 0.254011 |

In some embodiments, a receiver may perform a 32-bit correlation operation on the synchronisation portion of a received data packet by correlating with two copies of the 16-bit first binary chip sequence placed one after the other. Such a correlator will match pairs of instances of the repeated 16-bit sequence that occur in the synchronisation portion. The 16-bit sequences that provide optimal autocorrelation in simulations of such embodiments have been found to be different from those where a 16-bit correlator is used. They are presented in the table below.

Where a 32-bit correlation operation is performed, the synchronisation portion, and a '1' bit (or equivalently a '0' bit) in the data portion, may be represented by any 16-bit pattern taken from the table below (or the bitwise complement and/or back-to-front reflection of one of the entries). The opposite bit value in the data portion may be represented as the same sequence but with the first and last bit values flipped. The quality value is based on the same definition given above.

| Pattern (for 32-bit correlator) | Quality |
|---|---|
| [1 0 0 0 1 1 0 1 0 1 1 1 0 1 0 0] | 0.232281 |
| [1 1 0 1 0 0 0 1 0 1 0 0 1 1 1 0] | 0.232607 |
| [1 1 0 0 1 0 1 1 0 0 0 1 1 0 1 0] | 0.246238 |
| [1 0 1 0 0 1 1 1 0 0 1 0 1 1 0 0] | 0.248749 |
| [0 1 0 1 1 0 0 0 1 1 0 1 0 0 1 1] | 0.250661 |
| [0 1 1 0 0 1 0 1 1 0 0 0 1 1 0 1] | 0.250678 |
| [0 0 0 1 1 0 1 0 1 1 0 0 1 0 1 1] | 0.251603 |
| [0 1 0 0 1 1 0 1 0 1 1 0 0 0 1 1] | 0.252833 |
| [1 1 0 1 0 0 1 1 0 1 0 1 1 0 0 0] | 0.252869 |
| [0 0 1 0 1 1 0 0 1 0 1 0 0 1 1 1] | 0.253260 |
| [0 0 1 0 1 0 0 1 1 1 0 0 1 0 1 1] | 0.253473 |
| [0 0 1 1 1 0 0 1 0 1 0 0 1 1 0 1] | 0.254259 |
| [0 0 1 1 0 1 0 0 1 1 1 0 0 1 0 1] | 0.254626 |
| [1 0 0 0 1 1 0 1 0 1 1 1 0 1 0 0] | 0.232281 |

The radio transmitter may be wholly or substantially implemented as an integrated circuit. It may comprise, or be configured to communicate with, a microcontroller or other processor. It may be configured to receive message data from the microcontroller, processor, or other logic device, and to transmit the message data by radio. The radio receiver may be wholly or substantially implemented as an integrated circuit. It may comprise, or be configured to communicate with, a microcontroller or other processor. It may be configured to decode message data from one or more received data packets, and to output the message data to the microcontroller, processor, or other logic device. In some embodiments, the radio transmitter comprises, or is communicably connected to, an input source such as a button, keyboard, touchscreen or other sensor. In some embodiments, the radio receiver comprises, or is communicably connected to, an output such as a display, loudspeaker or indicator light.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which:

FIG. 1 shows a wireless heart-rate monitor 1 which is in communication with a mobile telephone 7. Both devices embody the present invention.

Figure 1:
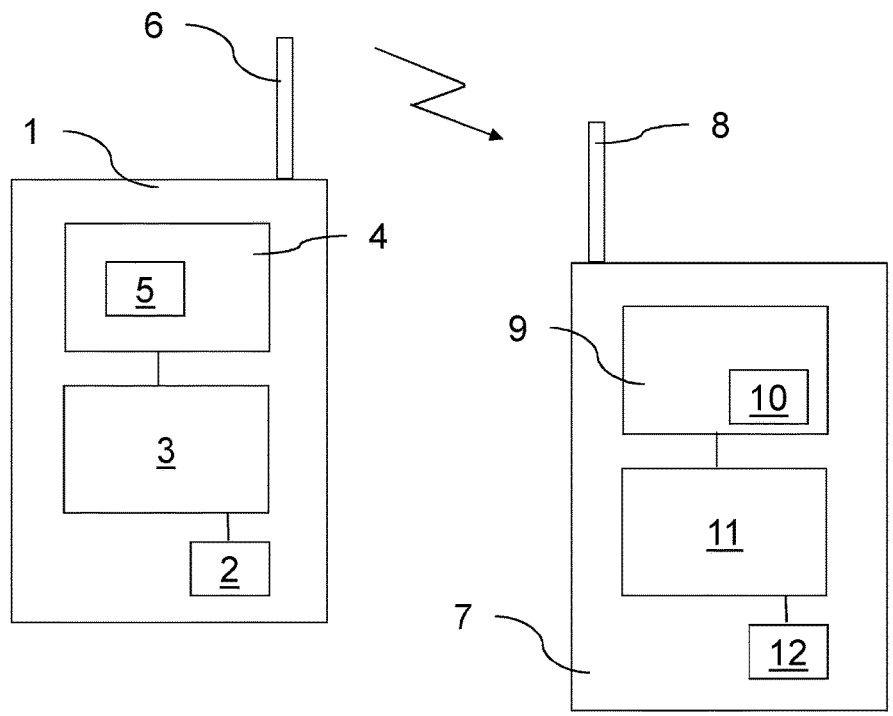
FIG. 1 is a schematic drawing of a radio communication system embodying the invention.

The wireless heart-rate monitor 1 has a heart-rate sensor 2 which is connected to a microprocessor 3 (such as an ARM™ Cortex M-series). The microprocessor 3 is connected to a radio transmitter 4. The radio transmitter 4 includes an encoder 5 (among other components). Other conventional components, such as memory, a battery, etc. are also present, but are omitted from the drawing for the sake of simplicity. The microprocessor 3 and radio transmitter 4 may be integrated on a single silicon chip. The monitor 1 has a radio antenna 6, which may be integrated on such a chip or external to it.

The mobile telephone 7 has, among other conventional components (not shown), an antenna 8, suitable for receiving short-range radio communications from wireless-personal-area-network devices, which is connected to a radio receiver 9. The radio receiver 9 includes a fixed-coefficient correlator 10 (among other components). The radio receiver 9 is connected to a microprocessor 11 (such as an ARM™ Cortex M-series), which can output data for display on a screen 12, possibly via other components, such as a further microprocessor (not shown) running an operating system and appropriate software applications.

In use, the wireless heart-rate monitor 1 receives periodic heart-rate readings for a human user from the heart-rate sensor 2. The microprocessor 3 processes the readings into a suitable format for transmission, and sends the message data to the radio transmitter 4. In some embodiments, the message data may already be differentially encoded, in order to improve the efficiency of the decoding operation on the radio receiver 9. The radio transmitter 4 determines whether the message data can fit within a single data packet, or if it must be split across two or more data packets. In either case, the radio transmitter 4 assembles the message data into a data portion, along with any other relevant data. The encoder 5 in the radio transmitter 4 encodes the data portion, containing the message data, to create a payload in which each '1' bit is represented by the 16-bit sequence [0 0 0 1 1 0 1 0 1 1 0 0 1 0 1 1] and each '0' bit is represented by the sequence [1 0 0 1 1 0 1 0 1 1 0 0 1 0 1 0] (or vice versa). It prepends a synchronisation word to the payload, consisting of 15 repetitions of the first sequence, [0 0 0 1 1 0 1 0 1 1 0 0 1 0 1 1]. A fixed preamble (e.g. of 8 chips) may be included before the synchronisation word.

The radio transmitter 4 then transmits the encoded data packet from the antenna 6, modulated on a radio-frequency carrier (e.g. at around 2.4 GHz), using two-level GFSK with a modulation index of 0.5. The data packet may contain additional elements, such as a preamble, if appropriate.

Figure 2:
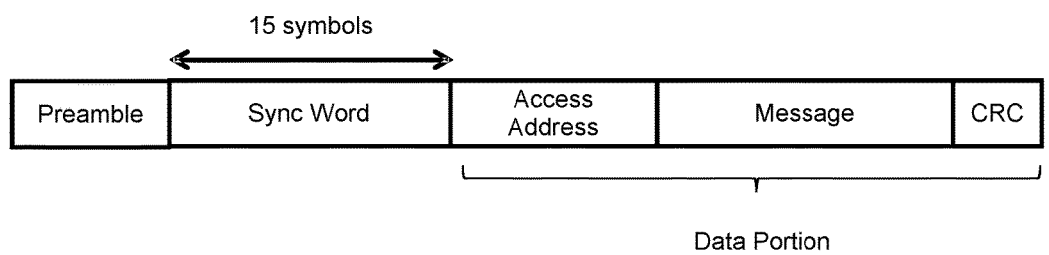
FIG. 2 is a diagram of a data packet that may be transmitted and received by the radio communication system.

FIG. 2 shows an exemplary data packet structure, which includes a fixed preamble, a synchronisation portion (sync word), and a data portion. The data portion contains an access address, message bits, and a cyclic-redundancy check (CRC).

The mobile telephone 7 receives the radio data packet at the antenna 8. The radio receiver 9 processes the GFSK signal using the correlator 10. The receiver 9 first correlates the received signal with the first 16-bit sequence [0 0 0 1 1

0 1 0 1 1 0 0 1 0 1 1], in order to determine frequency and/or timing synchronisation information from the synchronisation portion.

The radio receiver 9 then reconfigures the correlator 10 to correlate the received data portion with the 14-bit sub-sequence [0 0 1 1 0 1 0 1 1 0 0 1 0 1], which is the shared, middle 14 bits contained in each of the two 16-bit sequences. It processes I and Q components separately in order to determine the phase shift between successive appearances of the sub-sequence in the data portion. The radio receiver 9 decodes the message data from the phase shift information by using an initial phase reference from the synchronisation portion (which corresponds to an initial decoded bit value of '1', for instance) to decode any sequence that shifts in phase by approximately 180 degrees as having the opposite value to the immediately preceding decoded message bit, and any sequence that has approximately zero degrees of phase shift as having the same value as the immediately preceding decoded message bit.

The radio receiver 9 performs on-going drift tracking while processing the data packet, based on phase information output by the correlator 10.

The radio receiver 9 can then extract the message from the decoded data, check the CRC, and perform any other appropriate operations. It then passes the decoded message data to the microprocessor 11 for processing. The microprocessor 11 may process it in any appropriate way. In some embodiments, heart-rate information may be displayed graphically on the display screen 12 for the user to see.

The wireless heart-rate monitor 1 and mobile telephone 7 may be configured so that heart-rate message data is transferred from the wireless heart-rate monitor 1 to the mobile telephone 7 substantially according to the Bluetooth Low Energy (BTLE)™ core specification version 4.0, with the exception of the physical layer. The wireless heart-rate monitor 1 and mobile telephone 7 may be equipped for two-way radio communication, using corresponding components for radio transmission in the opposite direction, although this is not essential.

Figure 3:
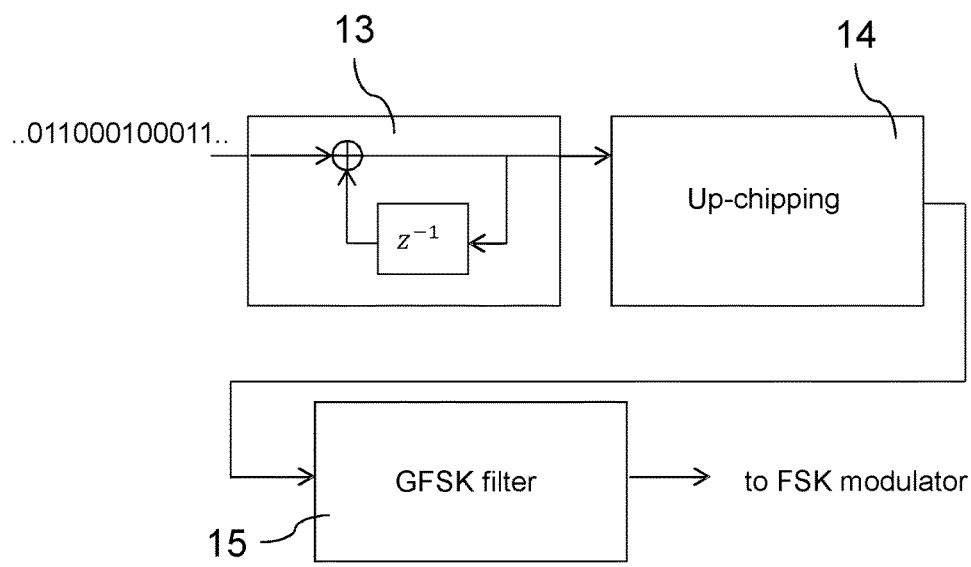
FIG. 3 is a schematic drawing of part of a radio transmitter embodying the invention.

FIG. 3 shows greater detail of elements within a radio transmitter embodying the invention. This could be the same radio transmitter 4 as described above, or it could be a different radio transmitter.

This radio transmitter first differentially encodes the data bits using a differential encoder unit 13. Each differentially encoded bit is then represented by one of two quasi-antipodal chip sequences, by an up-chipping unit 14. Each of the chips in a sequence is then feed through a GFSK filter 15 and is transmitted as a GFSK modulated signal.

Figure 4:
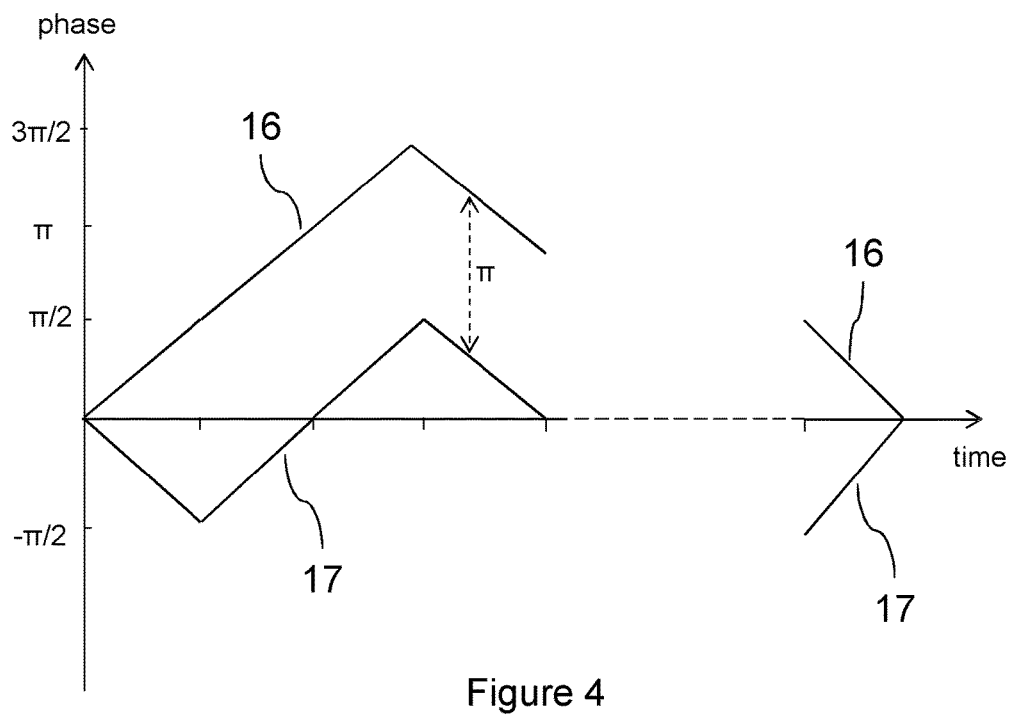
FIG. 4 is a plot of phase against time for two different chip sequences.

FIG. 4 illustrates two possible quasi-antipodal chip sequences 16, 17 that could be used by the up-chipping unit 14. The two chip sequences are the same length and differ only in the first and last chips. When, as is preferred, the modulation index is h=0.5 nominally, the phase difference between the two signals will be π everywhere except for the very first chip and the very last chip in the sequences, as can be seen from FIG. 4, which shows the first five chips of both sequences 16, 17, as well as the final chip (the remaining chips are omitted for conciseness).

Figure 5:
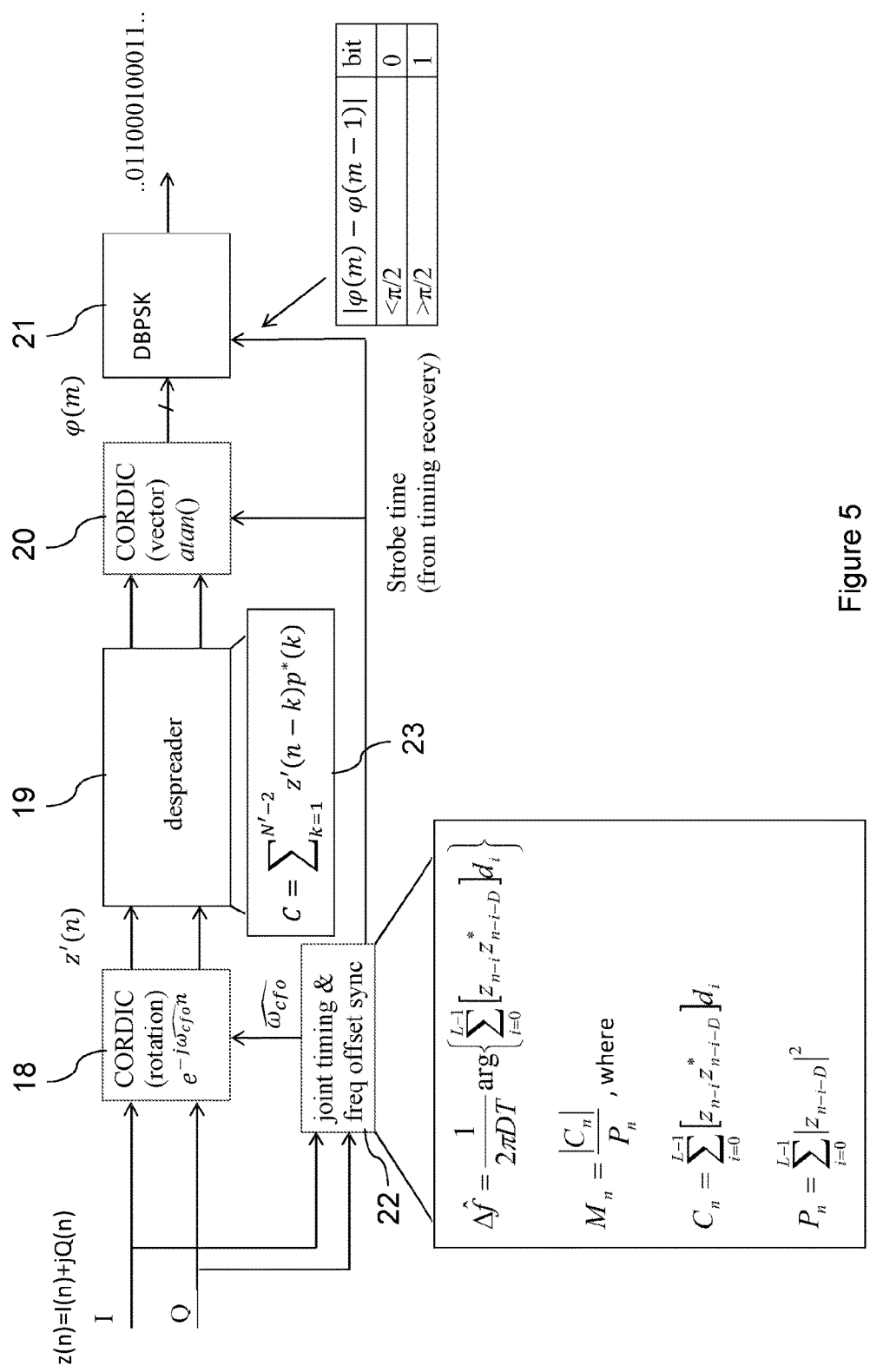
FIG. 5 is schematic drawing of part of a radio receiver embodying the invention.

FIG. 5 shows detail of a digital baseband processing stage of a radio receiver embodying the invention. This could be the same radio receiver 9 as described above, or it could be a different radio receiver.

Steps such as filtering and residual frequency offset tracking are not shown for reasons of conciseness.

The design of the radio receiver aims to optimize sensitivity while tolerating realistic channel conditions (carrier frequency offset, carrier drift, fading, etc.). It uses correlation for timing synchronization and detection.

Complex-valued baseband samples are shown entering from the left side of FIG. 5. These are passed to a CORDIC unit 18, and from there to a despreader unit 19. The despreader unit 19 performs a cross correlation between an incoming chip sequence containing data and a stored replica of this chip sequence. The output of the despreader unit 19 conveys the phase difference between the two different chip sequences. This is passed to a second CORDIC unit 20, and then on to a DBPSK decoder unit 21. The incoming samples are also passed to a synchronisation unit 22 which performs timing synchronization and initial carrier frequency offset estimation.

FIG. 5 contains the following abbreviations:
n=chip index;
m=symbol index;
z(n)=complex baseband samples;
z'(n)=carrier-frequency offset (CFO) compensated z(n); and
p(k)=complex values representing the chip sequence.

The synchronization is built around a particular kind of correlator. The correlator is a data-aided joint timing and frequency estimator which exploits knowledge of the data in the received symbols to cancel the effect of the modulation on the estimate of a conventional delay-and-correlate type of carrier frequency offset estimator. The principle behind the synchronisation is described in WO 2014/167318, by the present applicant, the entire contents of which are hereby incorporated by reference.

The performance of the radio receiver of FIG. 5, assuming ideal synchronisation, can be analysed as follows.

For discriminator detection of FSK signalling with a modulation index of h=0.5, it is expected that $E_b/N_0 \approx 12$ dB for a bit error rate (BER)=0.001. When cross-correlating directly on I and Q, the underlying theory for BER in additive white Gaussian noise (AWGN) is expected to follow that for non-coherent detection of correlated binary signalling. For a modulation index=0.5, $E_b/N_0 \approx 14.5$ dB for a bit error rate (BER)=0.001.

Discriminator detection will normally outperform non-coherent detection of correlated binary signalling for this modulation index. However, by correlating after the discriminator, the discriminator is here operating below the FM "threshold"—a region where detector performance deteriorates rapidly.

For differential detection of DBPSK, the $E_b/N_0 \approx 8$ dB for a bit error rate (BER)=0.001. This is 6.5 dB less compared to orthogonal detection and about 4 dB less than the case for discriminator detection of a GFSK signal given modulation index=0.5 Thus, utilizing DBPSK signalling on symbols made of GFSK modulated chips gives an inherent gain of 4 dB on the link budget. This is a very significant benefit of the present approach. This gain adds on top of the usual DSSS processing gain.

The "joint timing & freq. offset sync" synchronisation unit 22 in FIG. 5 carries out the following cross correlation for every incoming baseband sample $z_n = I(n) + jQ(n)$:

$$\Delta \hat{f} = \frac{1}{2\pi DT} \arg\left\{ \sum_{i=0}^{L-1} [z_{n-i} z^*_{n-i-D}] d_i \right\},$$

where L is the number of samples representing an up-sampled "sync word" (such as the 16-bit sequence specified above); where D is a lag which is decided at design time; and where T is the sample period.

The coefficients are given as $d_i = p_i^* p_{i+D}$ where p are the samples constituting the up-sampled and modulated sync word bits. The correlator should be sampled at the right point in time for the frequency offset estimate to be valid, and this time instant is when a "peak" is observed in the value of $M_n$ given by:

$$M'_n = \frac{|C_n|}{P_n}, \text{ where } C_n = \sum_{i=0}^{L-1} [z_{n-i} z^*_{n-i-D}] d_i \text{ and } P_n = \sum_{i=0}^{L-1} |z_{n-i-D}|^2.$$

A valid peak in $M_n$ is determined against a programmable threshold. A successful synchronisation event is defined by the observation of a few valid peaks spaced apart in time by amounts corresponding to the "sync word" length, plus or minus a value, $\Delta$, to account for noise. This synchronization event furthermore defines the strobe time to be used for subsequent detection of the data symbols.

The coefficients $d_i = p_i^* p_{i+D}$ are calculated at design time.

The DBPSK detection is implemented as follows.

The received sequence of complex baseband samples z(n) that represents a sequence of GFSK-modulated chips is processed by the digital-baseband-correlator despreader unit 19. The chip sequence constitutes one symbol with period $T_S$. Assuming a constant envelope A:

$$z(n) = A e^{j\varphi(n)}, \text{ where } \varphi(n) = \varphi_0 + \omega_{cfo} n + \varphi_m(n).$$

Here, $\varphi_0$ represents a constant phase offset between the transmitter and the receiver, while $\omega_{cfo}$ represents a negligible carrier frequency offset (a non-zero carrier frequency offset will result in a constellation rotation between symbols; unless this offset is kept sufficiently small after carrier-frequency offset estimation and compensation, the bit error rate will increase). The differential phase modulation is embedded in $\varphi_m(n)$ which represents the phase relative to the previous symbol, and will take on values in $\{0, \pi\}$.

The message data bits are determined in the decoder unit 21 by observing the phase shift of $\varphi_m(n)$ between consecutive received symbols. The radio transmitter applies the same phase shift to all chips in a symbol, depending on the data to be transmitted. Each bit of the message data may therefore be differentially decoded, with no phase shift implying a '0' and a phase shift of $\pi$ implying a '1' (or vice versa, depending on how the differential encoding is implemented in the radio transmitter).

In order to correlate N values of z(n) with a set of N complex coefficients representing N GFSM modulated chips (assuming no oversampling for now, for simplicity), the coefficients p(k) can be written as:

$$p(k) = e^{j\varphi_k}.$$

Assuming, for simplicity, that $\omega_{cfo} = 0$, the complex-valued correlator output at time t is then given by:

$$C(t) = \sum_{k=0}^{N-1} z(n-k) p^*(k)$$

$$= A \sum_{k=0}^{N-1} e^{j\varphi(n-k)} e^{-j\theta_k}$$

$$= A \sum_{k=0}^{N-1} e^{j(\varphi_0 + \varphi_m(n-k) - \theta_k)}$$

$$= A \sum_{k=0}^{N-1} e^{j(\varphi_0 + q\pi)}, q \in \{0, 1\}, \text{ when timing synchronized}$$

-continued $$\varphi_m(n-k) - \theta_k \in \{0, \pi\}$$

$$= A N e^{j(\varphi_0 + q\pi)},$$

where angle(C(t)) = $\varphi_0 + g\pi$.

Thus the angular difference between C(t) and C(t+$T_S$) will be 0 or $\pi$. Note that $\varphi_0$ disappears.

If the angular difference is greater than $\pi/2$ or less than $-\pi/2$ the detector will output a '1'; otherwise it will output a '0'.

For coherent detection, $\varphi_0$ would need to be estimated.

Symbol timing synchronization or tracking can be done by detecting the time when a "peak value" is observed on |C(t)|.

The residual carrier frequency offset $\omega_{cfo}$ is a consequence of carrier-frequency drift and initial carrier frequency offset estimation error, and can be tracked by looking at the angular difference between C(t) and C(t+$T_S$). Thus $\omega_{cfo}$ can be estimated as:

$$\widehat{\omega_{cfo}} = \frac{\text{angle}(C(t+T_s)) - \text{angle}(C(t))}{T_s},$$

after subtracting the known phase shift (after decision) due to the modulation. The residual carrier frequency offset $\widehat{F_{cfo}}$ in [Hz] is then calculated as $$\widehat{F_{cfo}} = \widehat{\omega_{cfo}} \frac{1}{2\pi} [\text{Hz}].$$

Figure 6:
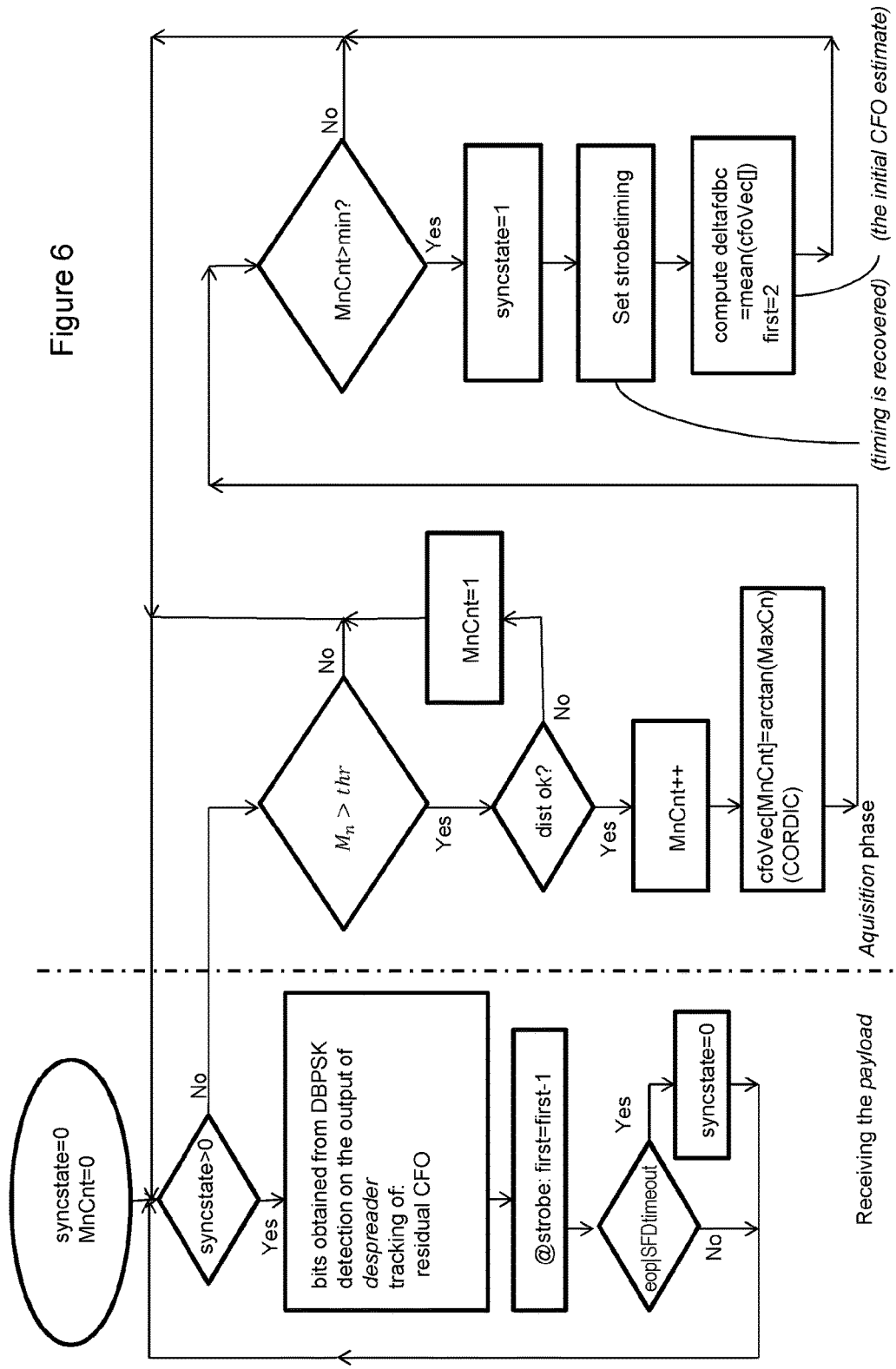
FIG. 6 is a state diagram for this radio receiver.

FIG. 6 shows a finite state machine (FSM) that can orchestrate the synchronization process and data reception in a radio receiver as illustrated in FIG. 5.

The state of this FSM is given by the variable syncstate. At time t=0 the FSM starts out in syncstate=0. In this state the FSM is to the right side of the dashed line in FIG. 6, and is looking for "peaks" in the value of $M_n$ computed by the synchronisation unit 22. For each "peak", the $\Delta\hat{f}$ value is recorded in a vector element cfoVec[MnCnt], and the "peak" counter MnCnt is incremented by one. When a sufficient minimum number min of such peaks with a certain distance dist between each peak has been observed, initial timing and carrier frequency offset synchronization is achieved and syncstate is incremented by one.

The average time of the "peaks" as measured by a counter (which counts modulo the number of samples per symbol) defines the subsequent symbol boundaries (strobe timing). Additionally, an initial carrier frequency offset estimate is computed as the average of the elements in the vector cfoVec. This value, $\widehat{F_{cfo}}$, is then passed to the CORDIC unit 18.

Now, with syncstate>0, the FSM enters the left side of the dashed line in FIG. 6, for receiving the payload. In this state, the message data bits are determined in the decoder unit 21 by observing the phase shift of $\varphi_m(n)$ between consecutive received symbols, as described above. Additionally, the residual carrier frequency offset (CFO) is tracked and $\omega_{CFO}$ is computed, as described above. In turn, this value is used to update (by being added to) the value $\widehat{F_{cfo}}$ in the CORDIC unit 18.

The invention claimed is:

1. A radio transmitter comprising an encoder configured to receive one or more variable message bits and to encode each message bit that has a first value as a predetermined first binary chip sequence and to encode each message bit that has the opposite value as a predetermined second binary chip sequence,
   wherein the radio transmitter is configured to transmit data packets, each comprising (i) a predetermined synchronisation portion, comprising one or more instances of the first binary chip sequence, and (ii) a variable data portion, comprising one or more encoded message bits output by the encoder;
   wherein the radio transmitter is configured to transmit the data packets modulated on a radio carrier signal using Gaussian frequency-shift-keying (GFSK), and
   wherein the modulation of the first and second binary chip sequences is such that, for each binary chip sequence of the first and second binary chip sequences, the respective phase of the radio carrier signal at the end of the binary chip sequence is the same as the respective phase of the radio carrier signal at the start of the binary chip sequence.

2. The radio transmitter of claim 1, wherein the GFSK modulation has a modulation index of approximately 0.5.

3. The radio transmitter of claim 1, wherein one or each of the first and second binary chip sequences has a bit-length that is an even number greater than or equal to four.

4. The radio transmitter of claim 1, wherein one or each of the first and second binary chip sequences consists of an equal number of zero bits and one bits.

5. The radio transmitter of claim 1, wherein the second binary chip sequence is identical to the first binary chip sequence except at a first bit position and a last bit position, at which the second binary chip sequence differs from the first binary chip sequence.

6. The radio transmitter of claim 1, wherein a first bit of the first binary chip sequence differs from a last bit of the first binary chip sequence.

7. The radio transmitter of claim 1, wherein the first binary chip sequence has maximum autocorrelation performance, over a set of all possible binary sequences having lengths equal to a length of the first binary chip sequence, subject to constraints that the sequences in the set must have an equal number of zero bits and one bits, and that each sequence in the set must have a first bit that differs in value from a last bit of the respective sequence of the set.

8. The radio transmitter of claim 1, wherein the first binary chip sequence has an autocorrelation quality of less than 0.26, determined as a ratio of a maximum sidelobe amplitude to a zero-lag peak amplitude when the first binary chip sequence is correlated with a pulse train of four sequence-repetitions.

9. The radio transmitter of claim 1, wherein the first binary chip sequence is a 16-bit sequence selected from the group consisting of: (0 0 0 1 1 0 1 0 1 1 0 0 1 0 1 1), (1 1 0 1 0 0 1 1 0 1 0 1 1 0 0 0), (1 1 1 0 0 1 0 1 0 0 1 1 0 1 0 0), and (0 0 1 0 1 1 0 0 1 0 1 0 0 1 1 1).

10. The radio transmitter of claim 1, wherein the variable data portions of the data packets follow after the synchronisation portions without any gap.

11. A radio receiver configured to:
   receive data packets, each comprising a predetermined synchronisation portion, comprising one or more instances of a predetermined first binary chip sequence, and a variable data portion, comprising one or more encoded message bits, wherein each message bit that has a first value is encoded as the first binary chip sequence and each message bit that has the opposite value is encoded as a predetermined second binary chip sequence, wherein the data packets are modulated on a radio carrier signal using Gaussian frequency-shift-keying (GFSK), and wherein the modulation of the first and second binary chip sequences is such that, for each binary chip sequence of the first and second binary chip sequences, the respective phase of the radio carrier signal at the end of the binary chip sequence is the same as the respective phase of the radio carrier signal at the start of the binary chip sequence;
   use the synchronisation portion of a received data packet to perform a frequency or timing synchronisation operation, before decoding the variable data portion of the received data packet; and
   decode message bits from the variable data portion of the received data packet.

12. The radio receiver of claim 11, configured to demodulate the variable data portion of a received data packet using a differential-binary-phase-shift-keying (DBPSK) demodulator.

13. The radio receiver of claim 11, comprising a correlator, and configured to use the correlator for performing the frequency and/or timing synchronisation operation.

14. The radio receiver of claim 13, wherein the correlator is a fixed-coefficient correlator.

15. The radio receiver of claim 11, comprising a correlator that is switchable between two modes: a first mode in which the correlator correlates against the complete first binary chip sequence, and a second mode in which the correlator correlates against a sub-sequence of the first binary chip sequence.

16. The radio receiver of claim 12, configured to use the correlator in the first mode for processing the synchronisation portion of a received data packet, and to switch the correlator to the second mode for decoding message bits from the variable data portion.

17. The radio receiver of claim 12, wherein the sub-sequence is defined by bit positions in the first binary chip sequence at which the first and second binary chip sequences have equal values.

18. The radio receiver of claim 15, wherein the sub-sequence consists of all the bits of the first binary chip sequence except for the first and last bits of the first binary chip sequence.

19. The radio receiver of claim 13, wherein the correlator is configured to output amplitude information and wherein the radio receiver is configured to use the amplitude information to perform symbol timing synchronisation.

20. The radio receiver of claim 13, wherein the correlator is configured to output phase information and wherein the radio receiver is configured to use the phase information to perform an initial frequency synchronisation.

21. The radio receiver of claim 13, configured to use phase information from the correlator to perform on-going frequency drift tracking, and to apply appropriate adjustment or compensation if the frequency of a received signal drifts.

22. The radio receiver of claim 13, configured to use the correlator to determine whether a sub-sequence in the variable data portion of a received data packet has an approximately 0 or an approximately π phase change relative to an immediately-preceding occurrence of the sub-sequence in the variable data portion, and to use a signal representative of sub-sequence phase changes from the correlator over the variable data portion to determine the message bits.

23. A radio receiver comprising a fixed-coefficient correlator that is switchable between a first mode in which the correlator is configured to correlate a received signal against a binary chip sequence, and a second mode in which the correlator is configured to correlate a received signal against a sub-sequence from the binary chip sequence, shorter than the binary chip sequence, wherein the correlator is configured, when in the second mode, to output a signal representative of a phase shift between two successive occurrences of the sub-sequence in a received signal.

24. The radio receiver of claim 23, configured to use the signal representative of a phase shift between two successive occurrences of the sub-sequence in a received signal to decode message data from a data portion of a received data packet.

25. The radio receiver of claim 23, comprising a differential-binary-phase-shift-keying (DBPSK) demodulator for demodulating the data portion of a received data packet.

26. The radio receiver of claim 23, configured to use the correlator for performing a frequency or timing synchronisation operation.

27. The radio receiver of claim 23, configured to use the correlator in the first mode for processing a synchronisation portion of a received data packet, and to switch the correlator to the second mode for decoding message bits from a data portion of the received data packet.

28. The radio receiver of claim 23, wherein the sub-sequence consists of all the bits of the binary chip sequence except for a first bit and a last bit of the binary chip sequence.

29. The radio receiver of claim 23, wherein the correlator is configured to output amplitude information and wherein the radio receiver is configured to use the amplitude information to perform symbol timing synchronisation.

30. The radio receiver of claim 23, wherein the correlator is configured to output phase information and wherein the radio receiver is configured to use the phase information to perform an initial frequency synchronisation.

31. The radio receiver of claim 23, configured to use phase information from the correlator to perform on-going frequency drift tracking, and to apply appropriate adjustment or compensation if the frequency of a received signal drifts.

32. The radio receiver of claim 23, configured to use the correlator to determine whether a sub-sequence in a data portion of a received data packet has an approximately 0 or an approximately $\pi$ phase change relative to an immediately-preceding occurrence of the sub-sequence in the data portion, and to use a signal representative of sub-sequence phase changes from the correlator to decode message bits from the data portion of the received data packet.

* * * * *